United States Patent
Koyabu et al.

(10) Patent No.: US 8,699,581 B2
(45) Date of Patent: Apr. 15, 2014

(54) IMAGE PROCESSING DEVICE, IMAGE PROCESSING METHOD, INFORMATION PROCESSING DEVICE, AND INFORMATION PROCESSING METHOD

(75) Inventors: Kyohei Koyabu, Kanagawa (JP); Takaaki Fuchie, Kanagawa (JP); Kenji Uehara, Tokyo (JP)

(73) Assignee: Sony Corporation, Tokyo (JP)

( * ) Notice: Subject to any disclaimer, the term of this patent is extended or adjusted under 35 U.S.C. 154(b) by 371 days.

(21) Appl. No.: 12/721,051

(22) Filed: Mar. 10, 2010

(65) Prior Publication Data

US 2010/0238822 A1  Sep. 23, 2010

(30) Foreign Application Priority Data

Mar. 18, 2009  (JP) ................ P2009-065584

(51) Int. Cl.
*H04N 7/12* (2006.01)
(52) U.S. Cl.
USPC ................ 375/240.25; 375/240.12
(58) Field of Classification Search
None
See application file for complete search history.

(56) References Cited

U.S. PATENT DOCUMENTS

2004/0264570 A1* 12/2004 Kondo et al. ............ 375/240.16
2006/0182182 A1*  8/2006 Nakajima et al. ........ 375/240.25
2006/0233528 A1   10/2006 Shigata et al.
2006/0245504 A1   11/2006 Ogikubo et al.
2008/0144715 A1*  6/2008 Kondo et al. ............ 375/240.15
2010/0150238 A1*  6/2010 Watanabe et al. ........ 375/240.13

FOREIGN PATENT DOCUMENTS

| JP | 2004-88722 | 3/2004 |
| JP | 2004-208258 | 7/2004 |
| JP | 2004-208259 | 7/2004 |
| JP | 2006 319962 | 11/2006 |
| JP | 2007-184791 | 7/2007 |
| JP | 2008-219204 | 9/2008 |
| JP | 2008-219887 | 9/2008 |
| JP | 2008-263640 | 10/2008 |
| WO | WO 2004/012459 | 2/2004 |

* cited by examiner

*Primary Examiner* — David Oveissi
(74) *Attorney, Agent, or Firm* — Frommer Lawrence & Haug LLP; William S. Frommer; Ellen Marcie Emas

(57) ABSTRACT

An image processing device includes: a holder configured to hold a reference picture necessary for decoding of an access unit as a processing subject in decoding of a stream composed of access units including a header; an analyzer configured to analyze the stream to thereby detect the header for each of the access units; and a generator configured to, if a header indicating change of deletion order of pictures is detected as the header detected by the analyzer, delete a picture included in an access unit corresponding to the header in the deletion order indicated by the header and generate hold information indicating a reference picture to be held by the holder.

11 Claims, 13 Drawing Sheets

DECODING ORDER

| I0 | P4 | Br2 | B1 | B3 |

DISPLAYING ORDER

| I0 | B1 | Br2 | B3 | P4 |

B

DECODING ORDER

| I0 | P4 | Br3 | B1 | B2 |

DISPLAYING ORDER

| I0 | B1 | B2 | Br3 | P4 |

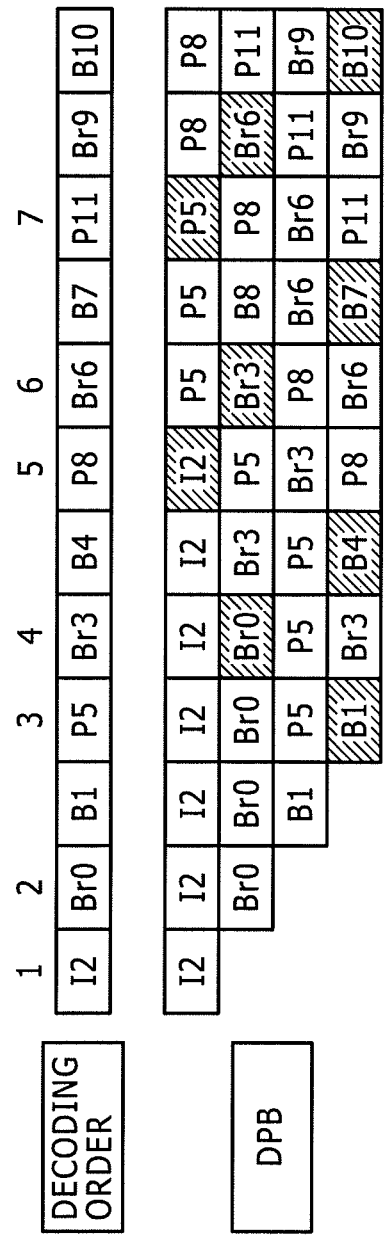
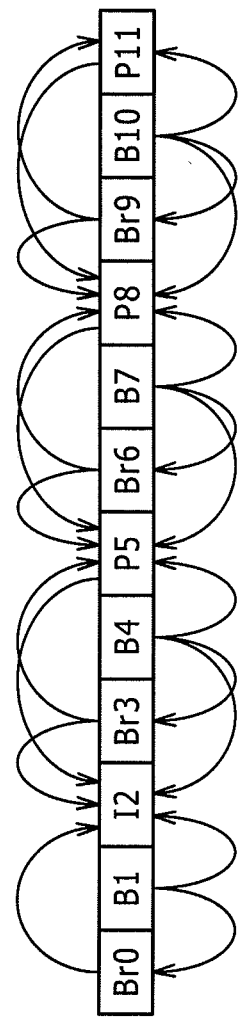
FIG.11A
FIG.11B

IMAGE PROCESSING DEVICE, IMAGE PROCESSING METHOD, INFORMATION PROCESSING DEVICE, AND INFORMATION PROCESSING METHOD

BACKGROUND OF THE INVENTION

1. Field of the Invention

The present invention relates to image processing devices, image processing methods, information processing devices, and information processing methods, and particularly to an image processing device, an image processing method, an information processing device, and an information processing method for enhancing the responsiveness to special reproduction of stream data.

2. Description of the Related Art

The MPEG (Moving Picture Coding Experts Group) 2 has been widely spread as a coding system for moving images. In recent years, the MPEG4 Part10: AVC (Advanced Video Coding) (hereinafter, referred to as the AVC) and so on also has come into existence.

The MPEG2 and the AVC are required to offer enhanced responsiveness in special reproduction such as random reproduction.

For the MPEG2, a method to meet this requirement exists. In this method, special reproduction is performed without redundantly decoding a reference picture to thereby allow efficient special reproduction (refer to e.g. Japanese Patent Laid-Open No. 2006-319962).

SUMMARY OF THE INVENTION

However, presently the AVC is incapable of sufficiently responding to this requirement. This is because the flexibility of the reference picture is greatly increased in the AVC compared with in the MPEG2 in order to enhance the compression efficiency and therefore the related-art method for the MPEG2 cannot be directly applied to special reproduction in the AVC.

Specifically, in the MPEG2, three kinds of pictures exist: the I picture (Intra Picture), the P picture (Predictive Picture), and the B picture (Bi-directional Predictive Picture).

The I picture is a picture obtained by independent coding only in the picture irrespective of previous and subsequent pictures. That is, the I picture is a picture that does not have the reference picture.

The P picture is a picture obtained by inter-frame forward predictive coding. That is, the P picture is a picture obtained by prediction with use of an I picture or a P picture existing in the forward direction as the reference picture.

The B picture is a picture obtained by bi-directional predictive coding from the forward and backward directions. That is, the B picture is a picture that is obtained by employing an I picture or P picture as the reference picture and obtained by reference to a picture existing in the forward or backward direction or in both the directions.

However, in the AVC, the flexibility of the reference to the I picture, the P picture, and the B picture in the MPEG2 is greatly increased as described above.

For example, in the AVC, also for the P picture, it is also possible to employ previous two pictures as the reference picture or employ subsequent two pictures as the reference picture. Furthermore, also for the B picture, it is also possible to employ only a previous picture as the reference picture or employ only a subsequent picture as the reference picture.

Therefore, in the AVC, the predictive coding cannot be performed merely by specifying the kind of picture among the I picture, the P picture, and the B picture. Consequently, the above-described related-art method for the MPEG2 cannot be directly applied to special reproduction in the AVC.

Furthermore, for the AVC, presently another method suitable to enhance the responsiveness in special reproduction such as random reproduction also does not exist.

There is a need for the present invention to enhance the responsiveness in special reproduction of stream data.

According to one embodiment of the present invention, there is provided an image processing device including a holder configured to hold a reference picture necessary for decoding of an access unit as a processing subject in decoding of a stream composed of access units including a header, an analyzer configured to analyze the stream to thereby detect the header for each of the access units, and a generator configured to, if a header indicating change of deletion order of pictures is detected as the header detected by the analyzer, delete a picture included in an access unit corresponding to the header in the deletion order indicated by the header and generate hold information indicating a reference picture to be held by the holder. In this image processing device, if a new reference picture needs to be included in N pictures held by the holder, the generator generates hold information of the access unit in accordance with a first rule that pictures are deleted in decreasing order of the time period of being held in the holder.

According to one embodiment of the present invention, there is provided an image processing method corresponding to the above-described image processing device according to one embodiment of the present invention.

According to one embodiment of the present invention, there is provided an information processing device including a holder configured to hold N pictures (N is an integer equal to or larger than one) including a reference picture necessary for decoding of an access unit as a processing subject in decoding of stream data composed of a plurality of access units in units of the access unit. The access unit includes actual data of a coded picture and is capable of including a header that allows specifying as to whether or not a reference picture is necessary for decoding of the picture and allows specifying of a reference picture if needed. The information processing device further includes an analyzer configured to analyze the stream data to thereby detect the header for each of the access units, and a creator configured to create a list of pieces of hold information indicating the N pictures to be held by the holder at a stage of decoding for each of the access units included in the stream data by using the header detected by the analyzer in units of the access unit.

According to one embodiment of the present invention, there is provided an information processing method corresponding to the above-described information processing device according to one embodiment of the present invention.

The embodiments of the present invention can enhance the responsiveness in special reproduction of stream data.

BRIEF DESCRIPTION OF THE DRAWINGS

FIG. 10 is a diagram for explaining an advantageous effect of the embodiment of the present invention;

FIGS. 11A and 11B are diagrams for explaining an advantageous effect of the embodiment of the present invention;

DETAILED DESCRIPTION OF THE PREFERRED EMBODIMENTS

Image processing devices according to two embodiments of the present invention (hereinafter, the embodiments will be referred to as the first embodiment and the second embodiment, respectively) will be described below with reference to the drawings. The description will be made in the following order.
1. Outline of the Present Invention
2. First Embodiment (the DPB list is completely created)
3. Second Embodiment (the DPB list is simply created)<

1. Outline of Present Invention

First, the outline of the method to which the embodiment of the present invention is applied (hereinafter, referred to as the method of the present invention) will be described below for easy understanding of the embodiments of the present invention.

The following description is based on the assumption that the image processing device is the main entity of the operation for processing executed in accordance with the method of the present invention.

In the embodiments, the image processing device treats stream data as the processing subject and executes the processing in units of an access unit (AU).

Figure 1:
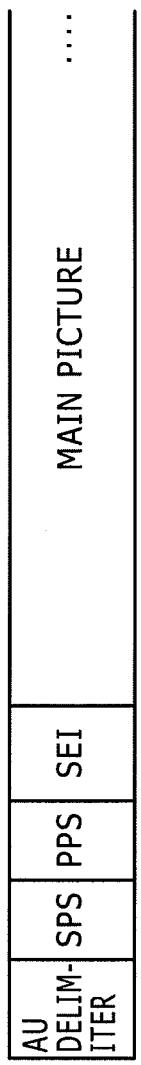
FIG. 1 is a diagram for explaining one example of the configuration of an access unit (AU)

The AU is the unit of storing of coded data corresponding to one picture and has a configuration shown in FIG. 1 for example.

As shown in FIG. 1, the AU is configured by disposing AU delimiter, SPS (Sequence Parameter Set), PPS (Picture Parameter Set), SEI (Supplemental Enhancement Information), a main picture, and so on in that order.

However, the constituent element that is essential for the AU is only the "main picture," which is the actual data of the picture. That is, the other constituent elements are not essential and whether or not they are present depends on the AU.

The AU delimiter is the start code indicating the beginning of the AU. In the AU delimiter, e.g. information (code name: primary_pic_type) indicating the kinds of slices included in the AU is included.

The slice is the basic unit of the coding. The main picture is composed of one or more slices.

The SPS is a header including information relating to the whole of the sequence. The sequence refers to the whole of compression-coded stream data and is composed of plural picture groups (Group of Picture, hereinafter referred to as the GOP).

In the SPS, e.g. information (code name: profile_idc) indicating the profile of the stream data and information (code name: level_idc) indicating the level of the stream are included.

Furthermore, information necessary for calculating the POC (Picture Order Count) is included in the SPS. The POC refers to information indicating the output order of the pictures. As the information necessary for calculating the POC, e.g. code names: pic_order_cnt_type, offset_for_non_refpic, num_ref_frames_in_pic_order_cnt_cycle are included in the SPS.

In addition, in the SPS, an ID (Identification, code name: seq_parameter_set_id) specifying which sequence the AU in which this SPS is included belongs to is included. This is because plural sequences can be treated in one stream data in the AVC.

Specifically, the number in the ID of the SPS is specified in the PPS to be described later, and whereby which sequence the AU in which this SPS is included belongs to is identified.

The PPS is a header indicating the coding mode of the whole of the picture.

For example, information (code name: entropy_coding_mode_flag) indicating the flag of the entropy coding mode is included in the PPS.

Furthermore, information necessary for calculating the POC is included in the PPS. As the information necessary for calculating the POC, e.g. code name: pic_order_present_flag is included in the PPS.

Moreover, e.g. an ID (code name: pic_parameter_set_id) is included in the PPS similarly to the SPS. Furthermore, e.g. the ID of the SPS to which the PPS refers (code name: seq_parameter_set_id) is included in the PPS.

The number in the ID of the PPS is specified in the slice header of the main picture, which will be described later, and whereby which sequence the AU in which this PPS is included belongs to is identified.

In this manner, the image processing device can identify which sequence a certain AU belongs to by tracking the ID of the PPS and the ID of the SPS. Details of the ID of the PPS and the ID of the SPS will be described later with reference to FIG. 2.

The SEI is information indicating additive information that is not essential for decoding of the VCL (Video Coding Layer).

For example, in the SEI, timing information of each picture relating to the HRD (Hypothetical Reference Decoder) and a pan scan function, which is a function to cut out part of a decoded image and display it, are included. Furthermore, e.g. information uniquely defined by the user (user data) and so on is included in the SEI.

As described above, the main picture is the actual data of the picture and is composed of one or more slices. One slice header is associated with one slice for example.

In the slice header, e.g. information (code name: first_mb_in_slice) defining the first macroblock address in the slice and information (code name: slice_type) defining the coding type of the slice are included.

Furthermore, e.g. information (code name: pic_parameter_set_id) specifying the number of the ID of the PPS is included in the slice header as described above.

In addition, information necessary for calculating the POC is included in the slice header. As the information necessary for calculating the POC, e.g. code names: pic_order_cnt_lsb, delta_pic_order_cntZ_bottom, delta_pic_order_cnt, redundant_pic_cnt are included in the slice header.

If stream data as the processing subject is input to the image processing device, the image processing device analyzes the stream data in units of such an AU.

First, the image processing device detects an AU from the stream data.

The image processing device analyzes the AU to extract and store the information necessary for the decoding, such as the above-described SPS, PPS, and slice header.

As described above, the information for obtaining the POC is included in the extracted SPS, PPS, and slice header. Thus, the image processing device calculates the POC based on these pieces of information.

Moreover, the image processing device can obtain a DPB (Decoded Picture Buffer) list from the information of the SPS, the PPS, and the slice header.

The DPB refers to a buffer for storing decoded pictures used for the prediction of the picture as the decoding subject. In the present specification, the name the DPB list is employed for the list of the decoded pictures stored in this buffer. Details of the DPB list will be described later with use of FIG. 3.

In the AVC, reference to the pictures in the DPB is made for the decoding of the picture as the decoding subject. Therefore, the image processing device needs to hold the DPB list at the timing of the decoding of the picture. The image processing device of the related art updates the DPB list every time one picture as the decoding subject is decoded. That is, the image processing device of the related art does not create the DPB list prior to the decoding.

On the other hand, the embodiments of the present invention employ a method in which unnecessary pictures are not decoded in order to perform special reproduction more smoothly. For this purpose, the embodiments of the present invention employ a method in which the SPS, the PPS, and the slice header are extracted when stream data is input and the DPB list is created prior to the decoding. This method is the method of the present invention.

FIG. 1 shows one example of the configuration of an AU.

Before the description of the embodiments of the present invention, the ID of the SPS and the PPS included in the AU will be described below with reference to FIG. 2 for easy understanding of the embodiments of the present invention.

The kinds of ID in the SPS and the PPS are limited. Specifically, the number of kinds of ID of the SPS is 32: from 0 to 31. The number of kinds of ID of the PPS is 256: from 0 to 255. Therefore, in the case of stream data including many AUs, the SPSs and the PPSs having the same ID possibly exist.

Figure 2:
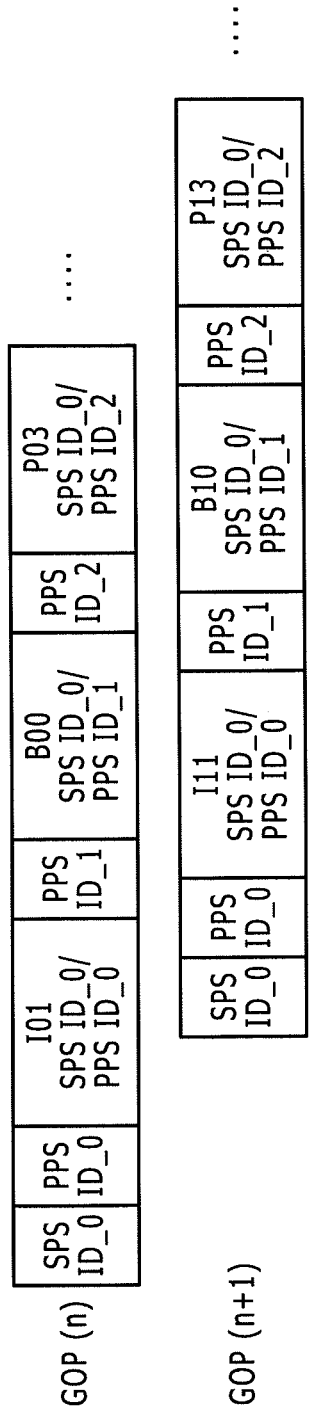
FIG. 2 is a diagram for explaining the ID of sequence parameter set (SPS) and picture parameter set (PPS)

FIG. 2 shows one example of the configuration of GOPs at times n and n+1, where n denotes an integer equal to or larger than one.

In FIG. 2, symbol ID_k (k is an integer that is equal to or larger than one and can be taken by the respective IDs) represented in the frames indicating the SPS and the PPS indicates the ID of the SPS and the PPS. Hereinafter, representation as SPS(ID_k) indicates the SPS of ID=k. Similarly, representation as PPS(ID_k) indicates the PPS of ID=k.

In addition, I, B, and P represented in FIG. 2 indicate an I picture, a B picture, and a P picture, respectively. The numbers added to I, B, and P indicate the picture numbers of the I picture, the B picture, and the P picture.

Moreover, the ID of the SPS or the PPS represented in the frame indicating an I picture, a B picture, or a P picture indicates the ID of the SPS or the PPS corresponding to this picture.

Specifically, the SPS and the PPS corresponding to I01 in GOP(n) are SPS(ID_0) and PPS(ID_0), respectively. Furthermore, the SPS and the PPS corresponding to B00 in GOP(n) are SPS(ID_0) and PPS(ID_1), respectively.

In the example of FIG. 2, plural AUs are included in GOP (n) in the coding order. Specifically, in GOP(n), SPS(ID_0), PPS(ID_0), and I01 (SPS(ID_0), PPS(ID_0)) are included as a first AU. Subsequently, in GOP(n), PPS(ID_1) and B00 (SPS(ID_0), PPS(ID_1)) are included as a second AU. Subsequently, in GOP(n), PPS(ID_2) and P03 (SPS(ID_0), PPS (ID_2)) are included as a third AU.

Furthermore, in the example of FIG. 2, plural AUs are included in GOP(n+1) in the coding order. Specifically, in GOP(n+1), SPS(ID_0), PPS(ID_0), and I11 (SPS(ID_0), PPS(ID_0)) are included as a first AU. Subsequently, in GOP (n+1), PPS(ID_1) and B10 (SPS(ID_0), PPS(ID_1)) are included as a second AU. Subsequently, in GOP(n+1), PPS (ID_2) and P13 (SPS(ID_0), PPS(ID_2)) are included as a third AU.

For example, assuming that the image processing device carries out operation of displaying P03 in GOP(n), I11 in GOP(n+1), and P03 in GOP(n) in that order (in order of 1, 2, 3 shown in FIG. 2), a problem in displaying the P picture P03 as the third picture in the displaying order will be described below.

In this displaying, P03 employs I01 as the reference picture. Therefore, in order to decode P03 as the first picture in the displaying order, the image processing device needs to decode I01 as the reference picture first, and thereafter decode P03. Therefore, the image processing device decodes the pictures in order of I01, P03.

Subsequently, the image processing device decodes I11 as the second picture in the displaying order. I11 is a picture that does not have a reference picture, and therefore the image processing device decodes only I11.

Subsequently, in decoding of P03 as the third picture in the displaying order by the image processing device, I01 has been already decoded as the reference picture for the decoding of P03 as the first picture in the displaying order. Thus, the video signal obtained by the decoding of I01 has been already stored in a memory or the like in the image processing device. In this case, the image processing device does not decode I01 but decodes only P03.

To decode P03 as the third picture in the displaying order, SPS(ID_0) and PPS(ID_2) in GOP(n) are needed.

However, the AVC has a rule that the timing of input of the SPS and the PPS corresponding to the AU as the decoding subject may be any as long as this timing is previous to the timing of input of this AU. Therefore, in some cases, the SPS and the PPS corresponding to the AU as the decoding subject are input long before the input of this AU.

In the AVC of the related art, if the SPSs and the PPSs having the same ID exist, overwriting with the SPS and the PPS input later is often caused.

For example, in the example of FIG. 2, because I11 as the second picture in the displaying order is decoded, SPS(ID_0) in GOP(n) has been already overwritten with SPS(ID_0) in GOP(n+1). Thus, although SPS(ID_0) in GOP(n) is needed to decode P03, reference to SPS(ID_0) in GOP(n+1) is made. This often causes a trouble that the image processing device fails to normally decode P03.

To avoid this trouble, in the image processing device to which the method of the present invention is applied, in storing the SPS, the PPS, and the slice header, overwriting is not performed even when the SPS, the PPS, and the slice header have the same ID but they are stored independently on an AU-by-AU basis.

This is the end of the description of the ID of the SPS and the PPS included in the AU with reference to FIG. 2. Next, a method for creating the DPB list necessary to realize the method of the present invention will be described below with reference to FIG. 3.

Figure 3:
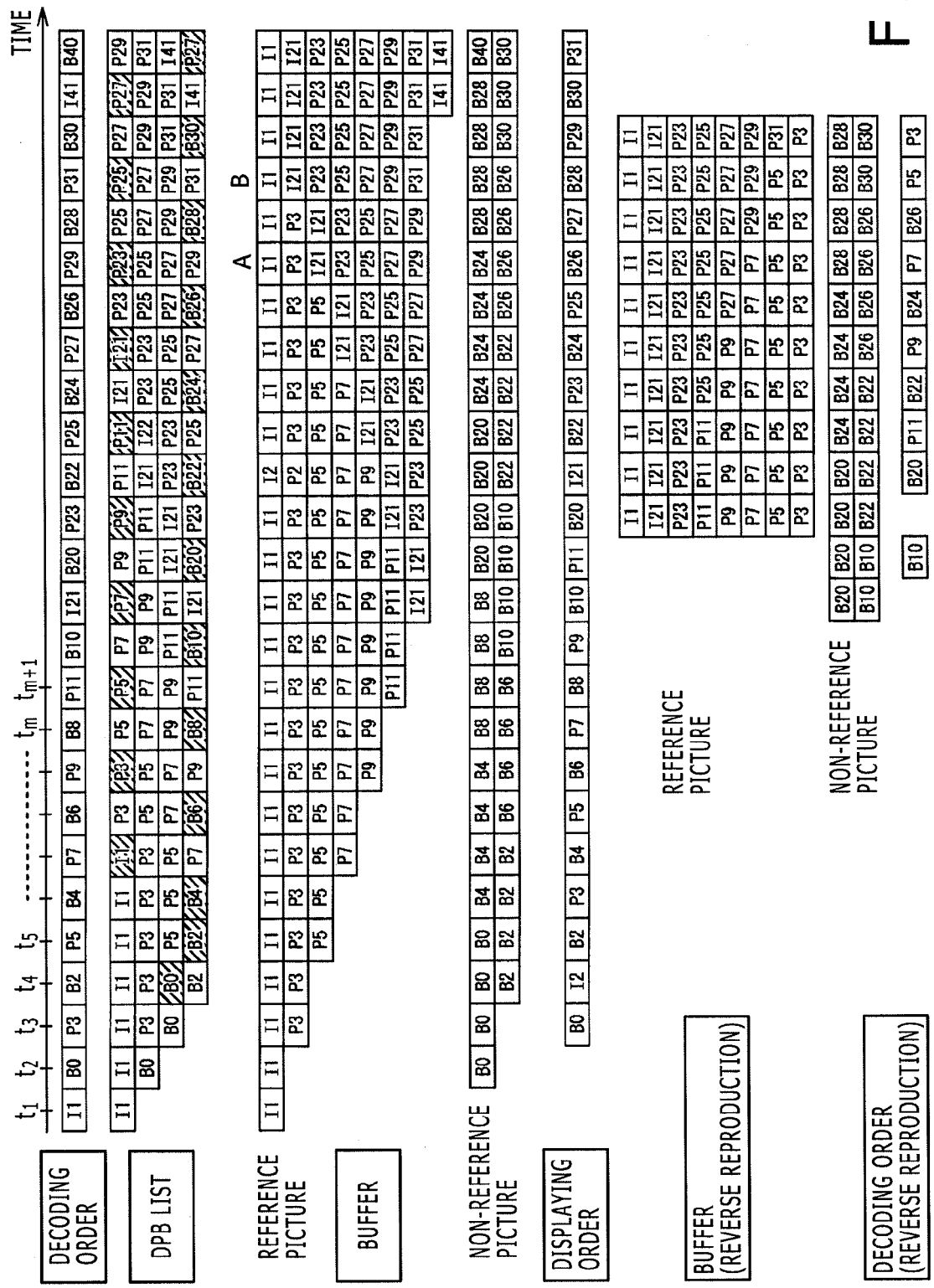
FIG. 3 is a diagram for explaining creation of a decoded picture buffer (DPB) list.

FIG. 3 is a diagram for explaining one example of the operation of performing reproduction with use of a DPB list by the image processing device.

In FIG. 3, pieces of information relating to the respective items of "decoding order," "DPB list," "buffer," "displaying order," "buffer (reverse reproduction)," and "decoding order (reverse reproduction)" are shown sequentially from the upper side.

In the item of "decoding order," the decoding order of the respective AUs (pictures) included in the stream data as the decoding subject is shown. Specifically, in the example of FIG. 3, the pictures shown in the item of "decoding order" are sequentially decoded along the time axis direction.

In the item of "DPB list," the DPB lists for such decoding are shown.

Of the DPB lists, the list indicating the pictures that should be stored in the DPB at time $t_{m+1}$ needs to be created at time $t_m$ at the least. The method for creating the DPB list will be described later with reference to FIG. 6.

The maximum number of pictures that can be stored in the DPB (hereinafter, referred to as the DPB maximum picture number) is decided in advance. For example, the embodiments are based on the assumption that the DPB maximum picture number is arbitrarily decided by the user. Specifically, for example, the example of FIG. 3 is based on the assumption that four is decided as the DPB maximum picture number.

In the item of "buffer," the stored contents in the buffer for storing the pictures obtained by the decoding are shown. In this buffer, the pictures obtained by the decoding are stored with separation into reference pictures and non-reference pictures.

In the item of "displaying order," the displaying order of the respective AUs (pictures) included in the stream data as the decoding subject is shown. Specifically, in the example of FIG. 3, the pictures shown in the item of "displaying order" are sequentially displayed along the time axis direction.

In the item of "buffer (reverse reproduction)," the stored contents in the buffer for storing the pictures obtained by the decoding, in the case of reversely reproducing the stream data (hereinafter, referred to as the reverse reproduction), are shown. Also in this buffer, the pictures obtained by the decoding are stored with separation into reference pictures and non-reference pictures.

In the item of "decoding order (reverse reproduction)," the decoding order of the respective AUs (pictures) included in the stream data as the decoding subject, in the case of the reverse reproduction, is shown. Specifically, in the example of FIG. 3, the pictures shown in the item of "decoding (reverse reproduction)" are sequentially decoded along the reverse direction of the time axis direction.

First, at time $t_1$, the image processing device refers to the contents of the DPB list corresponding to the time $t_1$ (i.e. I1), and decodes I1 to store decoded I1 in the DPB. At this time, I1 is stored in the buffer as a reference picture.

Subsequently, at time $t_2$, the image processing device refers to the contents of the DPB list corresponding to time $t_2$ (i.e. I1, B0), and decodes B0 to store decoded B0 in the DPB. Thereby, decoded I1 and B0 are stored in the DPB in matching with the contents of the DPB list corresponding to time $t_2$. Furthermore, B0 is newly stored in the buffer as a non-reference picture.

Subsequently, at time $t_3$, the image processing device refers to the contents of the DPB list corresponding to time $t_3$ (i.e. I1, P3, B0), and decodes P3 to store decoded P3 in the DPB. Thereby, decoded I1, P3, and B0 are stored in the DPB in matching with the contents of the DPB list corresponding to time $t_3$. Furthermore, P3 is newly stored in the buffer as a reference picture. At this time, the image processing device displays B0. The decoding of P3 and the storing of P3 in the DPB and the buffer are carried out at the same time.

Subsequently, at time $t_4$, the image processing device refers to the contents of the DPB list corresponding to time $t_4$ (i.e. I1, P3, B0, B2), and decodes B2 to store decoded B2 in the DPB. Thereby, decoded I1, P3, B0, and B2 are stored in the DPB in matching with the contents of the DPB list corresponding to time $t_4$.

However, four is decided as the DPB maximum picture number in the example of FIG. 3. Therefore, the number of pictures in the DPB list reaches the DPB maximum picture number at this timing. Thus, the image processing device deletes B0, which is the older in the displaying order, of the non-reference pictures B0 and B2 in the DPB list. In FIG. 3, the deleted picture is indicated by a hatched area.

Furthermore, the image processing device displays I2 at time $t_4$. The decoding of B2 and the storing of B2 in the DPB and the buffer are carried out at the same time.

Also in subsequent decoding, the decoding of a picture, the storing of a decoded picture, and the displaying of a decoded picture are carried out at the same time similarly.

The number of pictures in the DPB list reaches the DPB maximum picture number at the timing of time $t_4$ (at the timing of the decoding of B2 by the image processing device). Therefore, one picture needs to be surely deleted in the picture decoding after time $t_4$. As the deletion order of the pictures, first the older non-reference picture in the decoding order in the DPB list is deleted earlier. If the DPB list includes no non-reference picture, the older reference picture in the decoding order is deleted earlier.

Subsequently, at time $t_5$, the image processing device refers to the contents of the DPB list corresponding to time $t_5$ (i.e. I1, P3, P5, B2), and decodes P5 to store decoded P5 in the DPB. Thereby, decoded I1, P3, P5, and B2 are stored in the DPB in matching with the contents of the DPB list corresponding to time $t_5$. However, because the number of pictures in the DPB list has reached the DPB maximum picture number as described above, the non-reference picture B2 is deleted from the DPB list.

Furthermore, at time $t_5$, P5 is newly stored in the buffer as a reference picture.

In this manner, the image processing device sequentially decodes the pictures based on the DPB list.

One example of decoding in reverse reproduction as one example of special reproduction will be described below.

For example, suppose that the image processing device performs reverse reproduction in order of P29, P28, P27, . . . . In order for the image processing device to display P29, the pictures (A in FIG. 3) stored as the reference pictures in the buffer in the decoding of P29 in the forward reproduction are needed. Specifically, I1, P3, I21, P23, P25, P27, and P29 are needed for the displaying.

However, in the displaying of P29 in the reverse reproduction by the image processing device, I1, I21, P23, P25, P27, P29, and P31 shown by B in FIG. 3 are stored in the buffer at this timing, and therefore P3 is deficient. Thus, P3 is decoded and newly stored in the buffer in this case.

As above, also in special reproduction such as reverse reproduction, the reproduction processing with high reactivity can be executed because the reference pictures for the picture to be displayed are stored in the buffer to some extent.

2. First Embodiment

Configuration Example of Image Processing Device

Figure 4:
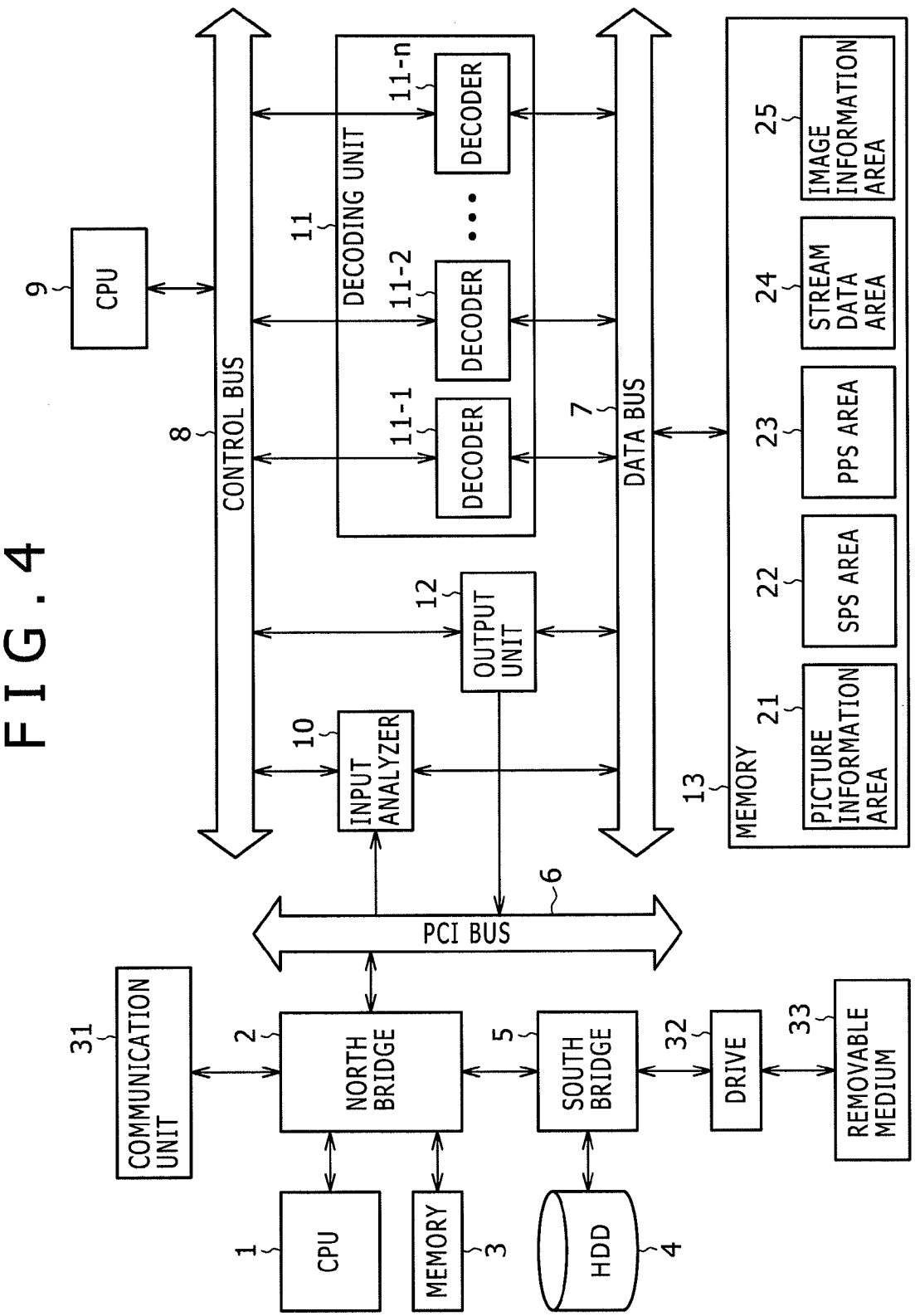
FIG. 4 is a block diagram showing one example of the configuration of an image processing device according to one embodiment of the present invention.

FIG. 4 is a block diagram showing a configuration example of the image processing device according to the first embodiment of the present invention.

The image processing device of the example of FIG. 4 includes a central processing unit (CPU) 1, a north bridge 2, a memory 3, a hard disk drive (HDD) 4, and a south bridge 5. Furthermore, the image processing device of the example of FIG. 4 includes a peripheral component interconnect/interface (PCI) bus 6, a data bus 7, and a control bus 8. In addition, the image processing device of the example of FIG. 4 includes a CPU 9, an input analyzer 10, a decoding unit 11, an output unit 12, and a memory 13.

The CPU 1 is connected to the north bridge 2 and controls processing for e.g. readout of data stored in the HDD 4.

Furthermore, for example, the CPU 1 generates and outputs a command for directing the start, change, and end of processing for scheduling of decoding, control of decoding and displaying output, and so on, executed by the CPU 9.

The north bridge 2 is connected to the PCI bus 6 and receives data stored in the HDD 4 via the south bridge 5 based on control by the CPU 1 for example.

The north bridge 2 transmits the data received from the HDD 4 to the input analyzer 10 via the PCI bus 6. Furthermore, the north bridge 2 is also connected to the memory 3 and transmits and receives the data necessary for processing by the CPU 1.

The memory 3 is a storage memory capable of storing the data necessary for processing executed by the CPU 1.

The south bridge 5 controls writing and reading of data to/from the HDD 4. Stream data is stored in the HDD 4.

The CPU 9 controls processing executed by the input analyzer 10, the decoding unit 11, and the output unit 12 via the control bus 8.

The input analyzer 10 is connected to the north bridge 2 via the PCI bus 6. Furthermore, the input analyzer 10 is connected to the memory 13 via the data bus 7. In addition, the input analyzer 10 is connected to the CPU 9 via the control bus 8.

If stream data is input to the input analyzer 10, the input analyzer 10 sequentially detects AUs.

The input analyzer 10 extracts the SPS, the PPS, and the slice header from the detected AU.

The input analyzer 10 stores the extracted SPS, PPS, and slice header in a picture information area 21 on an AU-by-AU basis.

As described above with reference to FIG. 2, in the AVC of the related art, if the SPS and PPS having the same ID exist, the SPS, the PPS, and the slice header are possibly overwritten with the SPS and PPS input later, which possibly inhibits normal decoding. Therefore, in the embodiments of the present invention, the SPS, the PPS, and the slice header are stored in the picture information area 21 on an AU-by-AU basis without overwriting even when the ID is the same.

Furthermore, the input analyzer 10 extracts the leading slice header and carries out association relating to which SPS and PPS the AU corresponds to (hereinafter, referred to as the association of the SPS and the PPS). In addition, the input analyzer 10 analyzes whether or not the picture of the AU is a reference picture.

If the picture of the AU is a reference picture, the input analyzer 10 analyzes not only the leading slice header but also all of the slice headers included in the AU and checks whether or not the MMCO (Memory Management Control Operation) is present. The MMCO is information for updating the DPB list.

Moreover, the input analyzer 10 stores the extracted SPS in an SPS area 22 in the memory 13 on an AU-by-AU basis. Furthermore, the input analyzer 10 also stores the extracted PPS in a PPS area 23 in the memory 13 on an AU-by-AU basis. This processing is to allow easy later reference to the SPS and the PPS.

Also in the storing of the SPS and the PPS in the SPS area 22 and the PPS area 23, respectively, the input analyzer 10 stores the SPS and the PPS in the SPS area 22 and the PPS area 23 on an AU-by-AU basis without overwriting even when the ID is the same, similarly to the storing in the picture information area 21.

The SPS and the PPS do not exist in the detected AU in some cases. In this case, the input analyzer 10 writes a pointer in the SPS and the PPS that are stored in the SPS area 22 and the PPS area 23 and correspond to the detected AU.

It is also possible to write the pointer not in the SPS and the PPS stored in the SPS area 22 and the PPS area 23 but in the SPS and the PPS of stream data stored in a stream data area 24.

However, as described above, the AVC involves the possibility that the necessary SPS and PPS are overwritten with other stream data subsequently input. Therefore, the embodiments of the present invention employ a method in which the pointer is written not in stream data but in the SPS and the PPS stored in the SPS area 22 and the PPS area 23.

There is a high-definition moving image recording format called the AVCHD (Advanced Video Codec High Definition, registered trademark by Panasonic Corporation and Sony Corporation). The AVCHD has a limit that the SPS and the PPS necessarily exist in the same GOP. Therefore, in the case of the AVCHD, it is also possible for the pointer to the SPS and the PPS to be given to stream data stored in the stream data area 24.

The CPU 9 timely calculates the POC based on the SPS, the PPS, and the slice header stored in the picture information area 21. Furthermore, the CPU 9 creates the DPB list. The POC and the DPB list are stored in the picture information area 21.

In addition, the CPU 9 also acquires information such as the DPB maximum picture number and information relating to whether the picture to be decoded is a reference picture or a non-reference picture from the SPS, the PPS, and the slice header stored in the picture information area 21.

If the MMCO is obtained after the decoding, the CPU 9 updates the DPB list in each case and updates the information in the picture information area 21.

The decoding unit 11 decodes supplied stream data and outputs a non-compressed video signal based on control by the CPU 9. The decoding unit 11 can decode one frame in a time sufficiently shorter than the displaying time during which one frame is displayed.

The memory 13 is connected to the decoding unit 11 via the data bus 7. The non-compressed video signal obtained by the decoding by the decoding unit 11 is stored in an image information area 25 in the memory 13.

The decoding unit 11 is so configured that plural decoders 11-1 to 11-n (n is an integer equal to or larger than one) can be controlled in parallel, for high-speed decoding.

The non-compressed video signal obtained by the decoding by the decoders 11-1 to 11-n (n is an integer equal to or larger than one) is stored in the image information area 25 in the memory 13, which is a common memory, so that redundant decoding of a reference picture may be prevented.

The decoding unit 11 may be provided as an independent unit that is not included in the image processing device.

If the creation of the DPB list by the CPU 9 is not progressing, the decoding unit 11 decodes reference pictures preferentially.

If the creation of the DPB list by the CPU 9 is progressing, the decoding unit 11 performs decoding in the following manner.

The decoding unit 11 performs the decoding based on the DPB list stored in the picture information area 21. The decoding unit 11 checks whether or not reference pictures exist for the AU as the decoding subject based on the DPB list.

If reference pictures do not exist, the AU as the decoding subject is decoded. On the other hand, if reference pictures for the AU as the decoding subject exist, the decoding unit 11 checks whether or not all of the reference pictures have been decoded. In other words, the decoding unit 11 checks whether or not all of the reference pictures for the AU as the decoding subject exist as the non-compressed video signal stored in the image information area 25.

If all of the reference pictures have been decoded, the AU as the decoding subject is decoded. If all of the reference pictures have not been decoded, the reference picture that has not been decoded is decoded first, and then the picture as the decoding subject is decoded.

Also in the decoding of the reference picture, the decoding unit 11 checks whether or not a further reference picture used for reference for this former reference picture is present based on the DPB list.

If the further reference picture exists, the decoding unit 11 decodes the further reference picture first, and then decodes the former reference picture. If the further reference picture does not exist, the decoding unit 11 directly decodes the former reference picture.

The basic way of thinking for deciding the decoding order is similar to that in the MPEG2. Specifically, the decoding unit 11 decodes the reference picture preferentially.

The preferentially-decoded reference picture is stored in the image information area 25, and the non-reference picture is decoded by the decoding unit 11 when the displaying thereof becomes necessary.

The above-described AVCHD has a limit that a reference B picture is not used for reference for another reference picture.

Therefore, in the AVCHD, the decoding unit 11 decodes the I picture and the P picture preferentially, and decodes the reference B picture and the non-reference picture according to need.

If the decoding is performed in such order, by the time a certain picture is decoded, all of the reference pictures for this picture have been stored in the image information area 25. Thus, the decoding unit 11 can immediately decode this picture.

Furthermore, by storing the reference pictures in the image information area 25 to some extent, the CPU 9 can perform special reproduction such as reverse reproduction with high reactivity.

The output unit 12 outputs the non-compressed video signal obtained by the decoding, input from the memory 13.

In special reproduction, the frame to be output is decided by a direct or indirect command from an input unit (not shown). The decoding unit 11 decodes the decided frame, and thereafter the non-compressed video signal obtained by the decoding is output from the output unit 12 based on control by the CPU 9. If the command from the input unit is an indirect command, the frame to be output next can be predicted. Thus, if the command is an indirect command, the decoding unit 11 also sequentially decodes the predictable frames.

The memory 13 is so configured as to include e.g. the picture information area 21, the SPS area 22 for storing the SPS, the PPS area 23 for storing the PPS, the stream data area 24, and the image information area 25.

The picture information area 21 stores information such as the SPS, the PPS, and the slice header input from the input analyzer 10. Furthermore, the picture information area 21 stores the POC and the DPB list input from the CPU 9. Moreover, the picture information area 21 stores information relating to whether the picture as the decoding subject is a reference picture or a non-reference picture.

The SPS area 22 independently stores the SPS of each AU separately from the picture information area 21.

The PPS area 23 independently stores the PPS of each AU separately from the picture information area 21.

The stream data area 24 temporarily stores stream data input from the input analyzer 10 and supplies the stream data to the decoding unit 11.

The image information area 25 stores the non-compressed video signal obtained by the decoding by the decoding unit 11.

The image processing device of the example of FIG. 4 can be configured as a system. The system refers to the whole of a device composed of plural devices and processors.

[Description of Processing by Image Processing Device]

A description will be made below about processing of reproducing stream data (hereinafter, referred to as stream data reproduction processing) by the image processing device of the example of FIG. 4, to which the embodiment of the present invention is applied.

Figure 5:
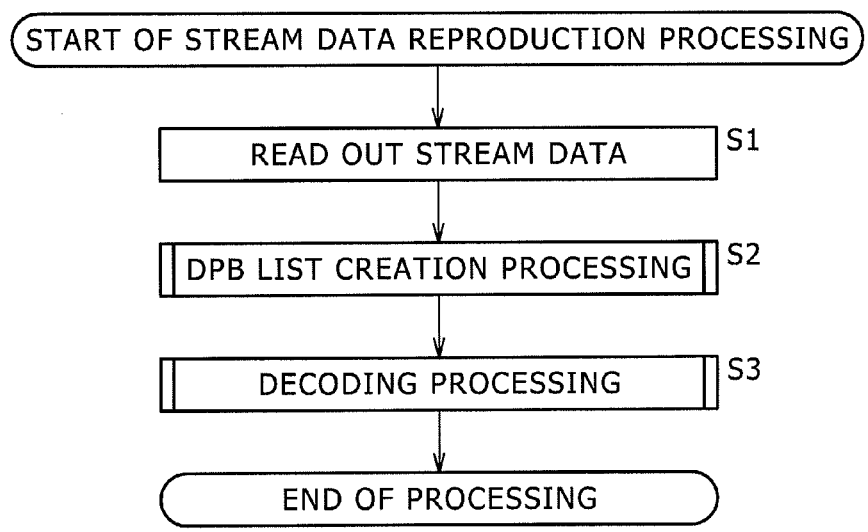
FIG. 5 is a flowchart for explaining stream data reproduction processing as one example of an image processing method according to the embodiment of the present invention.

FIG. 5 is a flowchart for explaining one example of the stream data reproduction processing in the processing by the image processing device according to the embodiment of the present invention.

In a step S1, the CPU 1 reads out stream data from the HDD 4 and outputs it to the input analyzer 10.

In a step S2, the CPU 9 controls the input analyzer 10 to create the DPB list for the input stream data. Hereinafter, the processing of the step S2 will be referred to as the DPB list creation processing. Details of the DPB list creation processing will be described later with reference to FIGS. 6 and 8.

In a step S3, the CPU 9 controls the decoding unit 11 to decode the stream data based on the created DPB list. Hereinafter, the processing of the step S3 will be referred to as the decoding processing. Details of the decoding processing will be described later with reference to FIGS. 7 and 9.

The stream data is decoded in this manner, so that the stream data reproduction processing is ended.

The details of the DPB list creation processing of the step S2 and the decoding processing of the step S3 will be individually described below in that order.

Figure 6:
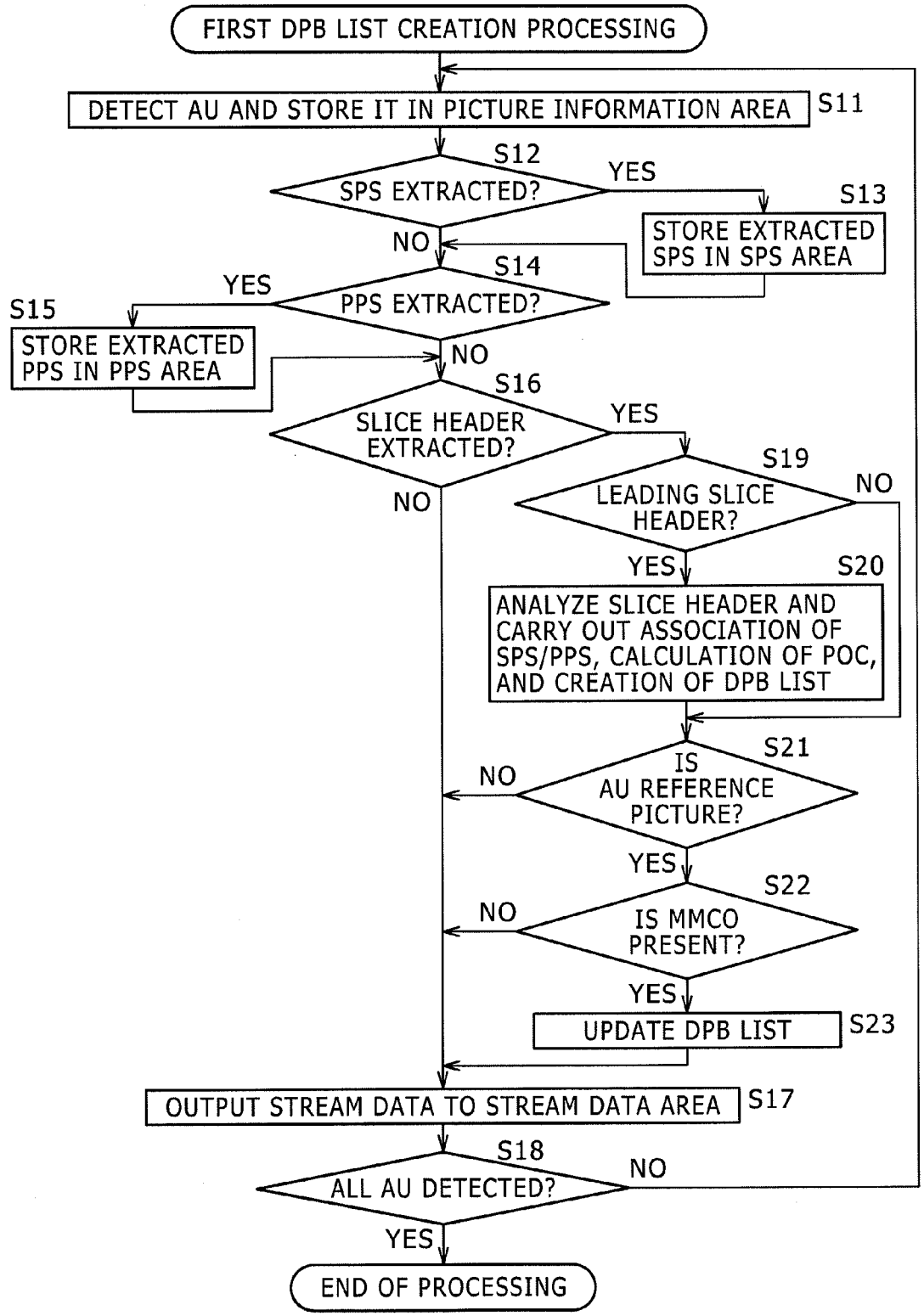
FIG. 6 is a flowchart for explaining first DPB list creation processing in the stream data reproduction processing of FIG. 5.

FIG. 6 is a flowchart showing a detailed example of the DPB list creation processing.

The DPB list creation processing of the example of FIG. 6 will be referred to as first DPB list creation processing particularly, for definite discrimination from another example of the DPB list creation processing (second embodiment) to be described later.

In a step S11, the input analyzer 10 detects an AU and stores it in the picture information area 21. In response thereto, the processing proceeds to a step S12.

In the step S12, the input analyzer 10 determines whether or not the SPS is extracted from the AU. In other words, the input analyzer 10 determines whether or not the SPS is included in the detected AU. If the SPS is extracted by the input analyzer 10, YES is obtained as the determination result in the step S12, so that the processing proceeds to a step S13.

In the step S13, the input analyzer 10 stores the extracted SPS in the SPS area 22. In response thereto, the processing proceeds to a step S14.

On the other hand, if the SPS is not extracted by the input analyzer 10, NO is obtained as the determination result in the step S12, so that the processing proceeds to the step S14 without execution of the processing of the step S13.

In the step S14, the input analyzer 10 determines whether or not the PPS is extracted from the AU. In other words, the input analyzer 10 determines whether or not the PPS is included in the detected AU. If the PPS is extracted by the input analyzer 10, YES is obtained as the determination result in the step S14, so that the processing proceeds to a step S15.

In the step S15, the input analyzer 10 stores the extracted PPS in the PPS area 23. In response thereto, the processing proceeds to a step S16.

On the other hand, if the PPS is not extracted by the input analyzer 10, NO is obtained as the determination result in the step S14, so that the processing proceeds to the step S16 without execution of the processing of the step S15.

In the step S16, the input analyzer 10 determines whether or not the slice header is extracted from the AU. In other words, the input analyzer 10 determines whether or not the slice header is included in the detected AU. If the slice header is extracted by the input analyzer 10, YES is obtained as the determination result in the step S16, so that the processing proceeds to a step S19. The processing of the step S19 and the subsequent steps will be described later.

On the other hand, if the slice header is not extracted by the input analyzer 10, NO is obtained as the determination result in the step S16, so that the processing proceeds to a step S17.

In the step S17, the input analyzer 10 stores the input stream data in the stream data area 24.

Specifically, because any of the SPS, the PPS, and the slice header are not extracted, the input analyzer 10 cannot analyze the AU in advance. Thus, in this case, the CPU 9 does not create the DPB list in advance but the input stream data is stored in the stream data area 24 directly.

In a step S18, the input analyzer 10 determines whether or not all of the AUs included in the stream data have been detected. If it is determined by the input analyzer 10 that all of the AUs included in the stream data have been detected, the first DPB list creation processing is ended.

On the other hand, if it is determined by the input analyzer 10 that all of the AUs included in the stream data have not been detected, the processing is returned to the step S11, so that the processing of this step and the subsequent steps is repeated.

That is, loop processing including the processing of the steps S11 to S17 and the processing of the steps S19 to S23, which will be described later, is repeated until it is determined in the step S18 by the input analyzer 10 that all of the AUs included in the stream data have been detected.

The processing thus far described corresponds to the case in which the slice header is not extracted from the AU by the input analyzer 10 in the step S16. The following description will deal with the case in which the slice header is extracted from the AU by the input analyzer 10, i.e. YES is obtained as the determination result in the step S16 and thus the processing proceeds to the step S19.

In the step S19, the input analyzer 10 determines whether or not the extracted slice header is the leading slice header.

If the slice header extracted by the input analyzer 10 is not the leading slice header, NO is obtained as the determination result in the step S19, and the processing proceeds to the step S21. The processing of the step S21 and the subsequent steps will be described later.

On the other hand, if the slice header extracted by the input analyzer 10 is the leading slice header, YES is obtained as the determination result in the step S19, and the processing proceeds to the step S20.

In the step S20, the CPU 9 carries out association of the SPS and the PPS, calculation of the POC, and creation of the DPB list. The DPB list created in this step is the DPB list at the timing of the input of this detected AU.

In the step S21, the input analyzer 10 determines whether or not the detected AU is a reference picture. If the detected AU is not a reference picture, NO is obtained as the determination result in the step S21 and the processing proceeds to the step S17, so that the processing of this step and the subsequent step is executed.

On the other hand, if the detected AU is a reference picture, YES is obtained as the determination result in the step S21 and the processing proceeds to the step S22.

In the step S22, the input analyzer 10 analyzes all of the slice headers included in the AU and determines whether or not the MMCO is present. If the MMCO is not present in the AU, NO is obtained as the determination result in the step S22 and the processing proceeds to the step S17, so that the processing of this step and the subsequent step is executed.

On the other hand, if the MMCO is present in the AU, YES is obtained as the determination result in the step S22 and the processing proceeds to the step S23.

In the step S23, the CPU 9 updates the DPB list based on an instruction by the MMCO to be described later and the processing proceeds to the step S17.

In this manner, the DPB list is created and the DPB list creation processing is ended.

This is the end of the description of the detailed example of the DPB list creation processing of the step S2 in the stream data reproduction processing of the example of FIG. 5. Next, a detailed example of the decoding processing of the step S3 will be described below.

Figure 7:
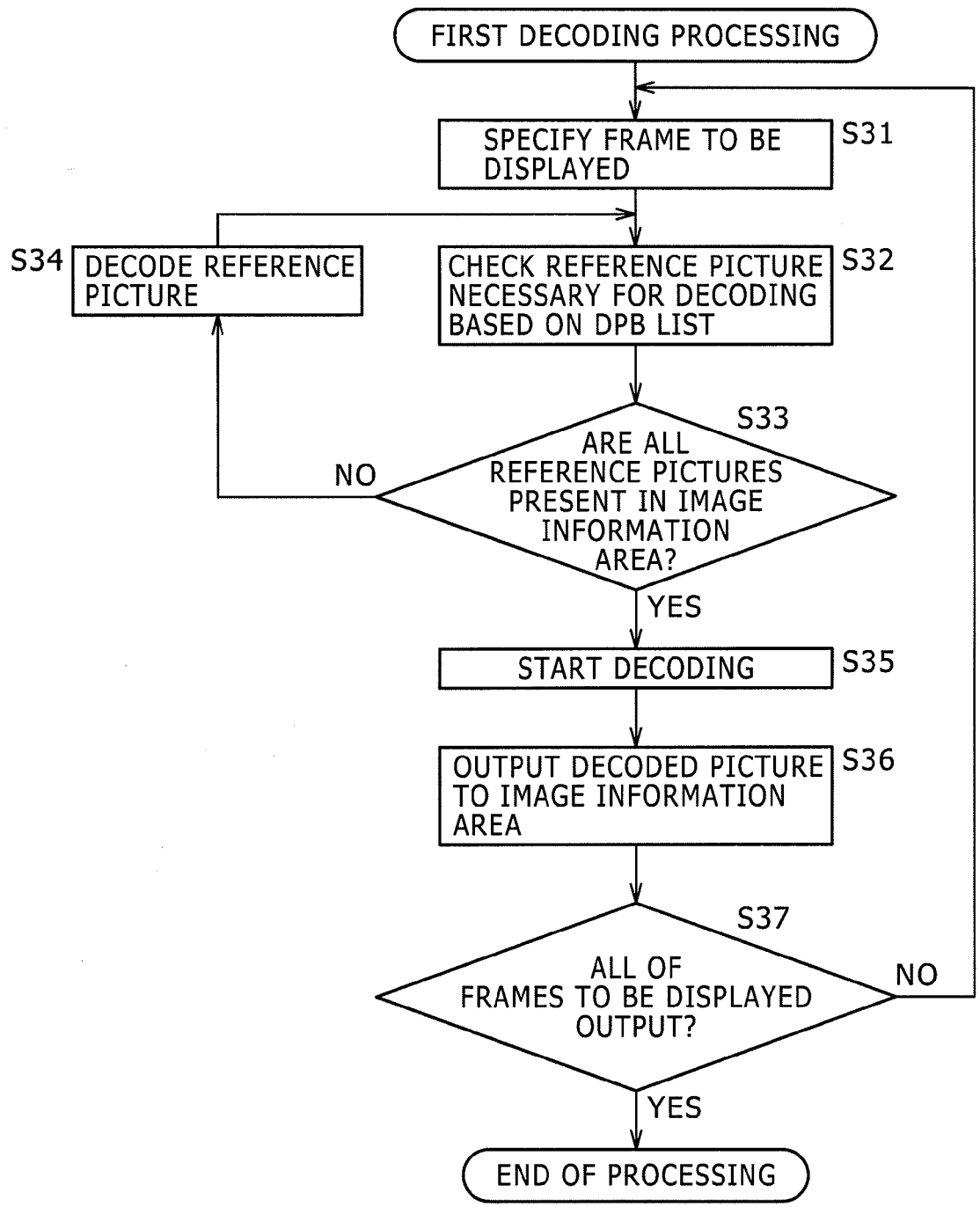
FIG. 7 is a flowchart for explaining first decoding processing in the stream data reproduction processing of FIG. 5.

FIG. 7 is a flowchart showing the detailed example of the decoding processing.

The decoding processing of the example of FIG. 7 will be referred to as first decoding processing particularly, for definite discrimination from another example of the decoding processing (second embodiment) to be described later.

In a step S31, the decoding unit 11 specifies the frame to be displayed.

In a step S32, the decoding unit 11 checks whether or not reference pictures necessary for decoding the frame to be displayed are present based on the DPB list.

In a step S33, the decoding unit 11 determines whether or not all of the reference pictures are stored in the image information area 25. If all of the reference pictures are stored in the image information area 25, YES is obtained as the determination result in the step S33 and the processing proceeds to a step S35. The processing of the step S35 and the subsequent steps will be described later.

On the other hand, if all of the reference pictures are not stored in the image information area 25, NO is obtained as the determination result in the step S33 and the processing proceeds to a step S34.

In the step S34, the decoding unit 11 decodes the reference picture that is not stored in the image information area 25. In response thereto, the processing is returned to the step S32, so that the processing of this step and the subsequent step is repeated.

That is, the loop processing of the step S32, the step S33 (NO), and the step S34 is repeated until all of the reference pictures are stored in the image information area 25. If the decoding of all of the reference pictures is completed and all of the reference pictures obtained by the decoding are stored in the image information area 25, YES is obtained as the determination result in the step S33 and the processing proceeds to the step S35.

In the step S35, the decoding unit 11 starts the decoding of the picture corresponding to the frame to be displayed.

In a step S36, the decoding unit 11 outputs the decoded picture as the frame to be displayed to the image information area 25.

In a step S37, the decoding unit 11 determines whether or not all of the frames to be displayed have been output. If it is determined by the decoding unit 11 that all of the frames to be displayed have been output, YES is obtained as the determination result in the step S37, so that the first decoding processing is ended.

On the other hand, if it is determined by the decoding unit 11 that all of the frames to be displayed have not been output, the processing is returned to the step S31, so that the processing of this step and the subsequent steps is repeated.

That is, the loop processing including the processing of the steps S31 to S36 is repeated until it is determined in the step S37 by the decoding unit 11 that all of the frames to be displayed have been output.

This is the end of the description of the stream data reproduction processing in the image processing device according to the first embodiment of the present invention with reference to FIGS. 5, 6, and 7.

The stream data reproduction processing including the DPB list creation processing described with reference to FIG. 6 and the decoding processing described with reference to FIG. 7 is processing for the case in which the DPB list is completely formed in advance. In the first embodiment, the CPU 9 does not need to update the DPB list in the decoding processing whether or not the MMCO is present.

On the other hand, the stream data reproduction processing including the DPB list creation processing to be described later with reference to FIG. 8 and the decoding processing to be described later with reference to FIG. 9, as the second embodiment, is processing for the case in which the DPB list is not completely formed in advance. Therefore, in the second embodiment, the CPU 9 needs to update the DPB list in the decoding processing if the MMCO is present in a slice header. Details thereof will be described later with reference to FIGS. 8 and 9.

In other words, the first embodiment provides a method of completely creating the DPB list. On the other hand, the second embodiment provides a method of simply creating the DPB list.

3. Second Embodiment

The image processing device according to the second embodiment of the present invention will be described below with reference to FIGS. 8 and 9.

For the second embodiment, details of the DPB list creation processing of the step S2 and the decoding processing of the step S3 in the flowchart of FIG. 5 will be individually described below in that order.

Figure 8:
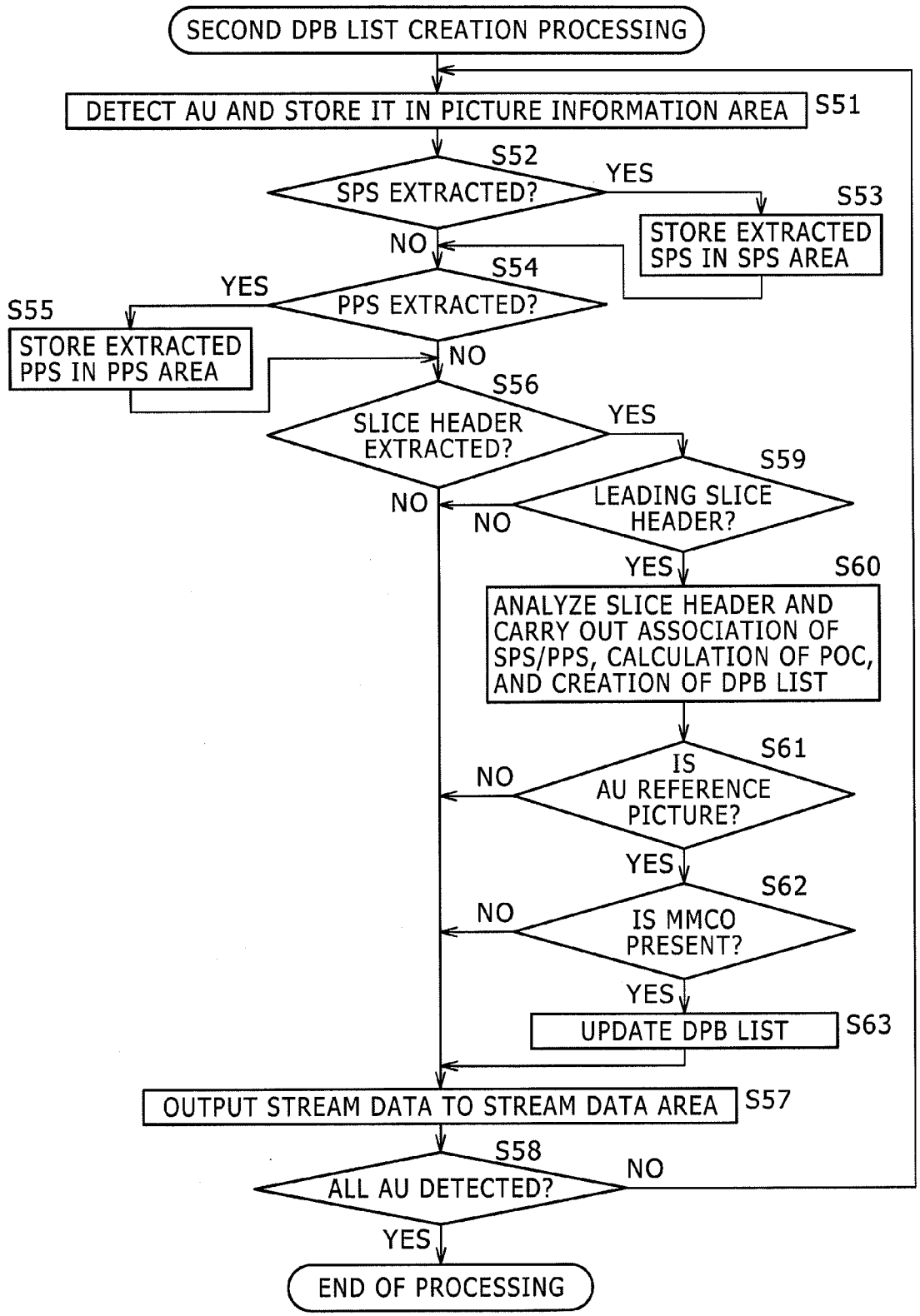
FIG. 8 is a flowchart for explaining second DPB list creation processing in the stream data reproduction processing of FIG. 5.

FIG. 8 is a flowchart showing a detailed example of the DPB list creation processing.

The DPB list creation processing of the example of FIG. 8 will be referred to as second DPB list creation processing particularly, for definite discrimination from the above-described example of the DPB list creation processing (first embodiment).

The processing of steps S51 to S58 in the second DPB list creation processing of the example of FIG. 8 is the same as the processing of the steps S11 to S18 in the first DPB list creation processing of the example of FIG. 6. Therefore, description thereof is omitted.

Furthermore, the processing of steps S60 to S63 in the second DPB list creation processing of the example of FIG. 8 is the same as the processing of the steps S20 to S23 in the first DPB list creation processing of the example of FIG. 6. Therefore, description thereof is omitted.

That is, the second DPB list creation processing of the example of FIG. 8 is different from the first DPB list creation processing of the example of FIG. 6 in only that a step S59 is different from the step S19. More specifically, the determination processing itself is the same between the step S19 and the step S59, but they are different in the way of the procession of the processing when the determination result is NO. Thus, a description will be made below about this difference between the step S59 in the second DPB list creation processing of the example of FIG. 8 and the step S19 in the first DPB list creation processing of the example of FIG. 6.

In the step S59 in FIG. 8, the input analyzer 10 determines whether or not the extracted slice header is the leading slice header. If the slice header extracted by the input analyzer 10 is not the leading slice header, NO is obtained as the determination result in the step S59 and the processing proceeds to the step S57, so that the processing of this step and the subsequent step is executed.

On the other hand, as described above, in the step S19 in FIG. 6, if the leading slice header is not extracted by the input analyzer 10, NO is obtained as the determination result in the step S19 and the processing proceeds to the step S21.

Specifically, in the DPB list creation processing of the example of FIG. 8, if the extracted slice header is not the leading slice header, the further analysis is not performed. On the other hand, in the DPB list creation processing of the example of FIG. 6, the processing of the step S21 and the subsequent steps is executed even when the extracted slice header is not the leading slice header, i.e. a slice header other than the leading slice header is extracted.

In other words, in the first embodiment, it is determined whether the AU is a reference picture even when a slice header other than the leading slice header is extracted. Furthermore, in the first embodiment, it is determined whether the MMCO is present in the slice header, and the complete DPB list is created by updating the DPB list. On the other hand, in the second embodiment, the DPB list is simply created.

This is the end of the description of the detailed example of the DPB list creation processing of the step S2 in the stream data reproduction processing of the example of FIG. 5 according to the second embodiment. Next, a detailed example of the decoding processing of the step S3 will be described below.

Figure 9:
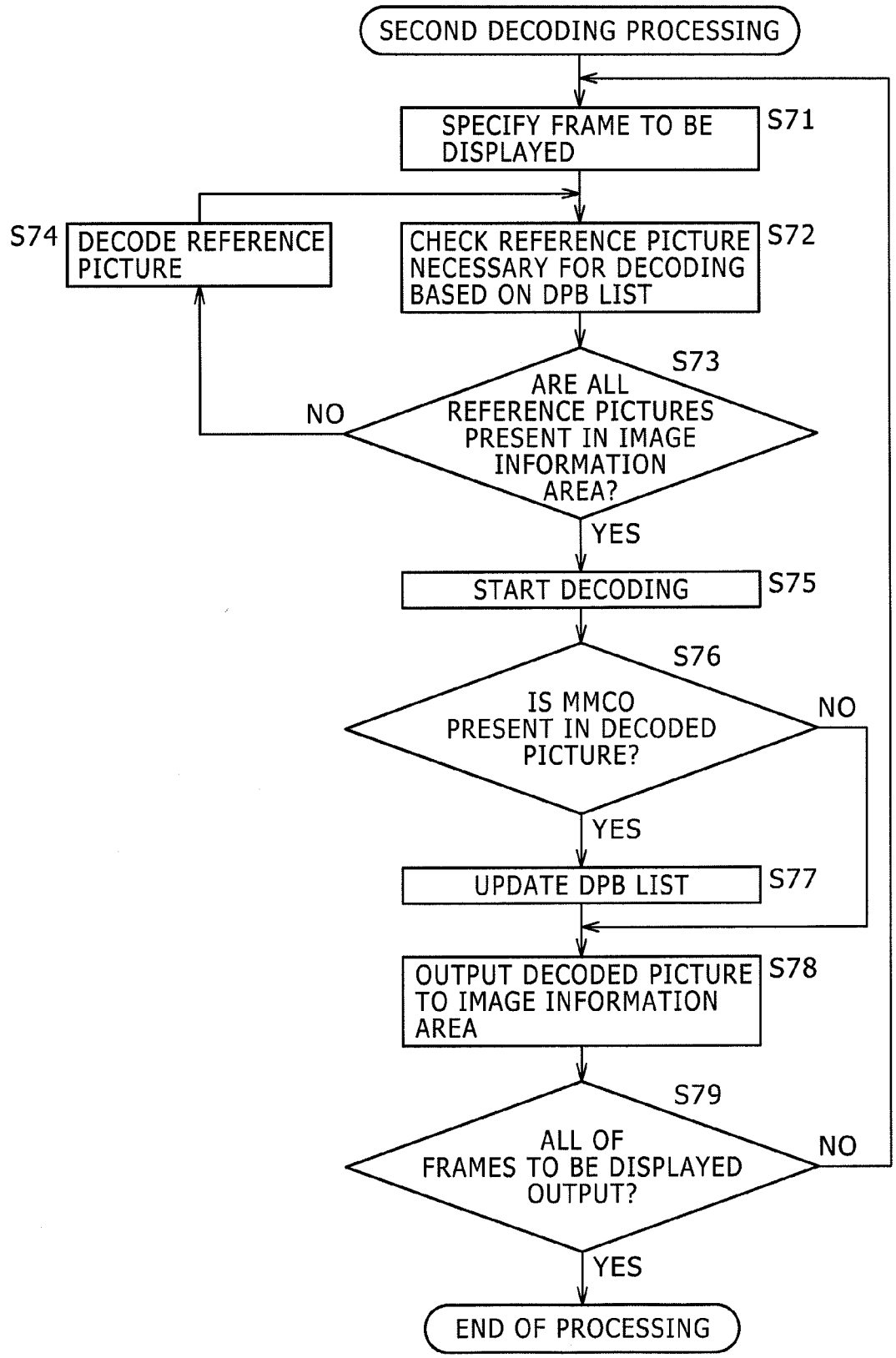
FIG. 9 is a flowchart for explaining second decoding processing in the stream data reproduction processing of FIG. 5.

FIG. 9 is a flowchart showing the detailed example of the decoding processing according to the second embodiment.

The decoding processing of the example of FIG. 9 will be referred to as second decoding processing particularly, for definite discrimination from the above-described example of the decoding processing (first embodiment).

The processing of steps S71 to S75 in the second decoding processing of the example of FIG. 9 is the same as the processing of the steps S31 to S35 in the first decoding processing of the example of FIG. 7.

Furthermore, the processing of steps S78 and S79 in the second decoding processing of the example of FIG. 9 is the same as the processing of the steps S36 and S37 in the first decoding processing of the example of FIG. 7. Therefore, description thereof is omitted.

That is, the second decoding processing of the example of the FIG. 9 is different from the first decoding processing of the example of FIG. 7 in only that a step S76 and a step S77 exist in the second decoding processing of the example of the FIG. 9. Therefore, the step S76 and the step S77 will be described below.

In the step S76, the decoding unit 11 determines whether or not the MMCO is included in the decoded picture. If the MMCO is included in the decoded picture, the processing proceeds to the step S77.

In the step S77, the CPU 9 updates the DPB list based on the MMCO and the processing proceeds to the step S78.

On the other hand, if it is determined in the step S76 by the decoding unit 11 that the MMCO is not included in the decoded picture, the updating of the DPB list is unnecessary and therefore the processing proceeds to the step S78.

That is, in the case of the decoding processing of the example of FIG. 9, the accurate DPB list is not created in the DPB list creation processing of the example of FIG. 8. Thus, the DPB list needs to be updated if the MMCO is present in the decoded picture.

This is the end of the description of the second embodiment with reference to FIGS. 8 and 9. Next, advantageous effects by the first embodiment and the second embodiment of the present invention will be described below with reference to FIGS. 10 to 12.

FIG. 10 shows the decoding order and the displaying order in stream data A and B.

The decoding order in the stream data A is I0, P4, Br2, B1, B3. The displaying order in the stream data A is I0, B1, Br2, B3, P4.

The decoding order in the stream data B is I0, P4, Br3, B1, B2. The displaying order in the stream data B is I0, B1, B2, Br3, P4.

In FIG. 10 and the subsequent diagrams, I and P denote an I picture and a P picture, respectively, as described with reference to FIG. 2. Furthermore, Br denotes a reference B picture and B denotes a non-reference B picture.

If the image processing device treading the stream data A and B is not that according to the embodiment of the present invention, i.e. the POC and the DPB list are not obtained in advance (hereinafter, this case will be referred to as the related-art case), the image processing device acquires only information on the kind of picture of the stream data.

Therefore, in the related-art case, only information indicating that the decoding order of the pictures is I, P, Br, B, B is obtained for both of the stream data A and B.

For example, suppose that the user has a desire to "display the third picture (Br2 in the stream data A2 or B2 in the stream data B)."

In the related-art case, plural kinds of displaying order will be possible for this demand because the information is only that indicating the decoding order is I, P, Br, B, B. Thus, the image processing device needs to perform decoding in such a manner as to sequentially obtain the POC for each one picture. Therefore, in the related-art case, the image processing device cannot rapidly respond to the user's demand.

However, if the image processing device treading the stream data A and B is that according to the embodiment of the present invention, i.e. the POC and the DPB list are obtained in advance (hereinafter, this case will be referred to as the present-invention case), the POC is known in advance.

Thus, it is possible to determine in advance whether the displaying order of the stream data having this decoding order of I, P, Br, B, B has the configuration for the stream data A or the configuration for the stream data B. Thus, by the necessary minimum decoding (in the case of the stream data B, I0, P4, Br3, B2), the image processing device can display the third picture B2. In other words, the image processing device according to the embodiment of the present invention can rapidly respond to the user's demand.

FIG. 11A shows one example of the decoding order of AVC stream data and the DPB list thereof. In FIG. 11B, the relationship of the dependence on the reference picture among the respective pictures in the stream data of FIG. 11A is shown by arrowheads.

The decoding order of the stream data of the example of FIG. 11A has a configuration almost similar to that of the general decoding order in the MPEG2, but is different from the general decoding order in the MPEG2 in that the reference B picture Br added in the AVC standard is used.

In the relationship of the dependence on the reference picture in the example of FIG. 11B, a limit that the B picture is not used for the reference for the I picture and the P picture is defined.

In this case, even if the POC and the DPB list are not obtained in advance, the decoding unit 11 can decode the I picture and the P picture in first with only information on the kind of picture and information relating to whether the picture is a reference picture or a non-reference picture.

Figure 12A:
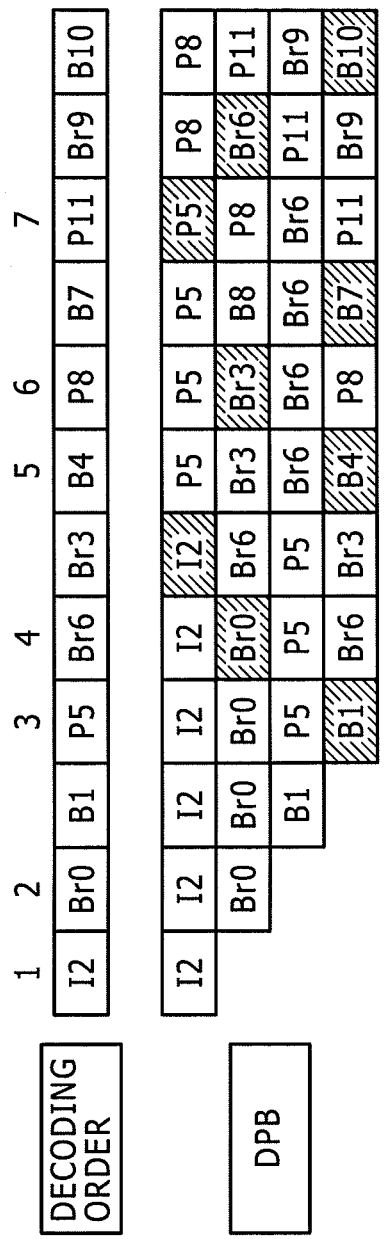
FIGS. 12A and 12B are diagrams for explaining an advantageous effect of the embodiment of the present invention.
Figure 12B:
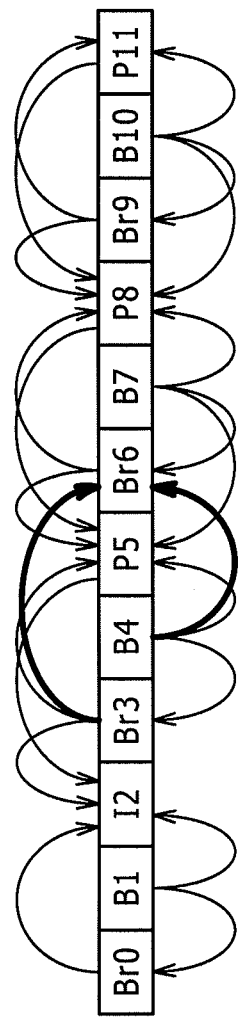

On the other hand, FIG. 12A shows another example of the decoding order of AVC stream data and the DPB list thereof. In FIG. 12B, the relationship of the dependence on the reference picture among the respective pictures in the stream data of FIG. 12A is shown by arrowheads.

The decoding order of the stream data of the example of FIG. 12A is different from the general configuration in the MPEG2, shown in FIG. 11A, i.e. this decoding order includes order of P, Br, Br, B, P.

In this case, it is difficult to anticipate the displaying order with only information on the kind of picture and information relating to whether the picture is a reference picture or a non-reference picture. Thus, the decoding unit 11 cannot decode only the I picture and the P picture in first.

For example, in the example of FIGS. 12A and 12B, the DPB list including P5, Br6, P8 is needed for the decoding of P11. However, in the related-art case, which picture should be deleted at the timing of the decoding of Br6 is unclear because the image processing device does not create the DPB list in advance. Thus, in the related-art case, an erroneous DPB list is possibly created. As a result, possibly subsequent decoding fails to be normally performed.

In the present-invention case, the accurate DPB list is created in advance, and therefore the image processing device can normally perform decoding even for the example of FIGS. 12A and 12B.

A description will be made below about creation of the DPB list when the MMCO is present with reference to FIGS. 13A and 13B.

Figure 13A:
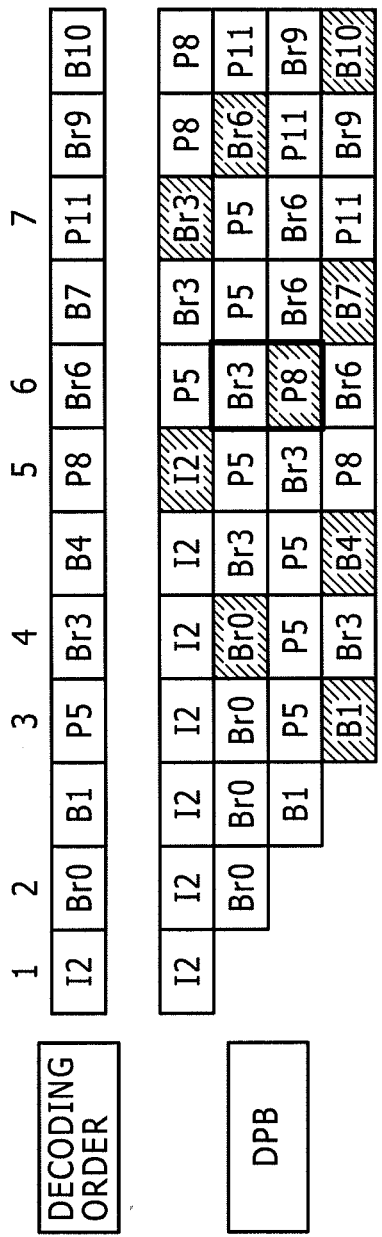
FIGS. 13A and 13B are diagrams for explaining the memory management control operation (MMCO).

FIG. 13A shows one example of the decoding order of AVC stream data and the DPB list thereof. In FIG. 13B, the relationship of the dependence on the reference picture among the respective pictures in the stream data of FIG. 13A is shown by arrowheads.

The decoding order of the stream data shown in FIG. 13A is the same as that of the stream data of the example of FIG. 11A. However, FIG. 13A is different from FIG. 11A in that the MMCO is present in Br6 in FIG. 13A.

In FIG. 13A, if the MMCO is not present in Br6, the CPU 9 deletes Br3 among P5, Br3, P8 in the creation of the DPB list. However, the CPU 9 follows the instruction by the MMCO if the MMCO is present. For example, suppose that the MMCO instructs the CPU 9 to delete P8 and leave Br3 in the DPB list in this example.

Figure 13B:
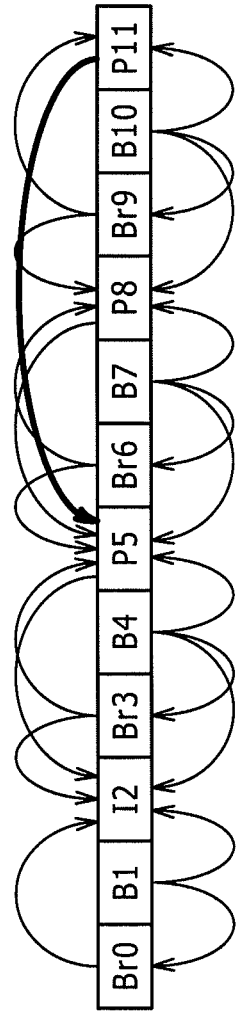

In this case, although the decoding order of the example of FIGS. 13A and 13B is the same as that of the example of FIGS. 11A and 11B, the DPB list for B7 and the subsequent pictures entirely differ therebetween. Thus, in such a case, operation of updating the DPB based on the instruction by the MMCO, i.e. creation of the complete DPB list, is needed.

The input analyzer 10 in the image processing device according to the embodiment of the present invention can detect an AU from stream data and can extract and store information necessary for decoding, such as the SPS, the PPS, and the slice header. The CPU 9 can create the DPB list based on these pieces of information.

In the image processing device according to the embodiment of the present invention, by creating the DPB list prior to decoding, stream data can be reproduced with the necessary minimum decoding.

In the image processing device according to the embodiment of the present invention, by calculating the POC prior to decoding, responsiveness in special reproduction of stream data can be enhanced.

The above-described series of processing can be executed by hardware or alternatively can be executed by software. In the case of executing the series of processing by software, the program for constructing the software is installed in a computer. Examples of this computer include a computer incorporated in hardware exclusively for the image processing device of FIG. 4 and e.g. a general-purpose personal computer that can execute various kinds of functions through installation of various kinds of programs therein.

In the computer incorporated in the hardware exclusively for the image processing device of FIG. 4, the CPU 1 carries out e.g. the following operation and thereby the above-described series of processing is executed. Specifically, for example, the CPU 1 loads a program stored in the memory 3 into a random access memory (RAM) (not shown) and executes it and thereby the above-described series of processing is executed.

The program to be executed by the computer (CPU 1) can be provided e.g. by recording it in a removable medium 33 as a package medium or the like. Alternatively, the program can be provided via a wired or wireless transmission medium such as a local area network, the Internet, or digital satellite broadcasting.

In the computer, the program can be installed in the memory 3, the HDD 4, and so on by loading the removable medium 33 in a drive 32. Furthermore, the program can be installed in the memory 3, the HDD 4, and so on through reception by a communication unit 31 via a wired or wireless transmission medium. Alternatively, the program can be installed in the memory 3, the HDD 4, and so on in advance.

The program to be executed by the computer may be a program to be processed in a time-series manner along the order described in the present specification, or may be a program to be processed in parallel or at the necessary timing, such as when calling is performed.

The present application contains subject matter related to that disclosed in Japanese Priority Patent Application JP 2009-065584 filed in the Japan Patent Office on Mar. 18, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a holder configured to hold therein hold information for a reference picture, necessary for decoding of an access unit, as a processing subject when decoding an input stream composed of access units, each access unit including a header;
an analyzer configured to analyze the entire input stream when input, prior to the input stream being decoded, to detect the header for each of the access units; and
a generator configured to,
(a) if the header indicating a change of a deletion order of pictures is detected by the analyzer, delete hold information for a picture from the holder in the deletion order indicated by the header and generate hold information indicating the reference picture to be held by the holder, and
(b) if a new hold information for a new reference picture needs to be included in a predetermined number of hold information for pictures held by the holder, the generator generates the hold information for the access unit in accordance with a first rule that hold information for pictures are deleted in decreasing order of a time period of being held in the holder.

2. The image processing device according to claim 1, wherein
the header include a first header including information relating to coding of whole of the stream, a second header including information relating to coding of whole of the picture, and a third header including information indicating the change of the deletion order of the pictures.

3. The image processing device according to claim 2, wherein
if the third header is detected by the analyzer, the generator creates the hold information in accordance with a second rule that pictures are deleted in deletion order specified by the third header.

4. The image processing device according to claim 1, wherein
if the holder holds the new reference picture at a stage of decoding of a predetermined picture, the generator deletes the pictures in decreasing order of a time period of being held in the holder and generates the hold information in decoding order.

5. The image processing device according to claim 1, further comprising
a decoding unit configured to decode the stream by controlling the picture to be held by the holder based on the hold information generated by the generator.

6. The image processing device according to claim 1, wherein
the generator further creates information indicating output order of the pictures in the stream by using the header.

7. The image processing device according to claim 1, further comprising
a storing unit configured to store the header analyzed by the analyzer and the hold information generated by the generator.

8. The image processing device according to claim 1, wherein
the access unit includes actual data of a coded picture and including a header that allows specifying whether the reference picture is necessary for decoding of the picture and allows specifying of the reference picture if the reference picture is needed.

9. An image processing method of an image processing device including a holder that holds therein hold information for a reference picture, necessary for decoding of an access unit, as a processing subject when decoding an input stream composed of access units, each access unit including a header, the method comprising the steps of:
analyzing the entire input stream when input, prior to the input stream being decoded, to detect the header for each of the access units; and
(a) if the header indicating a change of a deletion order of pictures is detected by processing of the step of analyzing the input stream, deleting hold information for a picture from the holder in the deletion order indicated by the header and generating hold information indicating the reference picture to be held by the holder, and
(b) if a new hold information for a new reference picture needs to be included in a predetermined number of hold information for pictures held by the holder, generating the hold information for the access unit in accordance with a first rule that hold information for pictures are deleted in decreasing order of a time period of being held in the holder.

10. An information processing device comprising:
a holder configured to hold N hold information for pictures (N is an integer equal to or larger than one) including hold information for a reference picture, necessary for decoding of an access unit, as a processing subject when decoding of stream data composed of a plurality of access units in units of the access unit, the access unit including actual data of a coded picture and including a header that allows specifying whether a reference picture is necessary for decoding of the picture and allows specifying of the reference picture if the reference picture is needed;
an analyzer configured to analyze the entire stream data when input, prior to the stream data being decoded, to detect the header for each of the access units; and
a creator configured to create, prior to decoding the stream data, a list of hold information indicating the N hold information for pictures to be held by the holder at a stage of decoding for each of the access units included in the stream data, the list created prior to decoding the stream data by using the header detected by the analyzer in units of the access unit.

11. An information processing method of an information processing device comprising the steps of:
holding in a holder N hold information for pictures (N is an integer equal to or larger than one) including hold information for a reference picture, necessary for decoding of an access unit, as a processing subject when decoding of stream data composed of a plurality of access units in units of the access unit, the access unit including actual data of a coded picture and including a header that allows specifying whether a reference picture is necessary for decoding of the picture and allows specifying of the reference picture if the reference picture is needed;
analyzing the entire stream data when input, prior to the stream data being decoded, to detect the header for each of the access units; and
creating, prior to decoding the stream data, a list of hold information indicating the N hold information for the pictures to be held by the holder at a stage of decoding for each of the access units included in the stream data, the list created prior to decoding the stream data by using the header detected by processing of the step of analyzing the stream data in units of the access unit.

* * * * *